(12) United States Patent
Mayer et al.

(10) Patent No.: US 9,380,684 B2
(45) Date of Patent: Jun. 28, 2016

(54) METHOD AND SYSTEM FOR AN ELECTRONICALLY ADAPTIVE PHOTOMETRY FOR ROADWAY LIGHTING

(71) Applicant: GE Lighting Solutions, LLC, East Cleveland, OH (US)

(72) Inventors: Mark J. Mayer, Sagamore Hills, OH (US); Koushik Saha, Brunswick, OH (US); Kevin Carr Payne, Brecksville, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/252,042

(22) Filed: Apr. 14, 2014

(65) Prior Publication Data

US 2015/0296597 A1 Oct. 15, 2015

(51) Int. Cl.
| | |
|---|---|
| H05B 37/02 | (2006.01) |
| H05B 33/08 | (2006.01) |
| F21V 7/00 | (2006.01) |
| F21V 7/04 | (2006.01) |
| F21V 7/10 | (2006.01) |
| F21V 17/12 | (2006.01) |

(52) U.S. Cl.
CPC ............ *H05B 37/0272* (2013.01); *F21V 7/005* (2013.01); *F21V 7/04* (2013.01); *F21V 7/10* (2013.01); *F21V 17/12* (2013.01); *H05B 33/0845* (2013.01); *H05B 37/0245* (2013.01); *Y02B 20/72* (2013.01)

(58) Field of Classification Search
CPC ............ H05B 37/029; H05B 33/0815; H05B 37/0254; H05B 33/0818; H05B 33/0827; H05B 33/0842; H05B 37/02; H05B 33/0806; H05B 33/0839; H05B 33/0887; H05B 33/0272; H05B 33/0845; H05B 37/0245; F21Y 2101/02; F21Y 2105/001; Y02B 20/72; Y02B 20/346; Y02B 20/36; G09G 2320/0626; G09G 2320/0666
See application file for complete search history.

(56) References Cited

U.S. PATENT DOCUMENTS

| | | | | |
|---|---|---|---|---|
| 4,006,355 | A * | 2/1977 | Shemitz et al. | .......... 362/217.06 |
| 6,758,573 | B1 | 7/2004 | Thomas | |
| 7,462,502 | B2 * | 12/2008 | Paolini et al. | .................... 438/22 |
| 8,100,552 | B2 * | 1/2012 | Spero | ............................ 362/231 |
| 8,258,702 | B2 * | 9/2012 | Zielinski | ............. H05B 33/086 307/10.8 |
| 8,300,219 | B1 * | 10/2012 | Gordin et al. | ............ 356/139.05 |
| 8,305,014 | B1 * | 11/2012 | Li | ...................... H05B 33/0854 315/112 |

(Continued)

FOREIGN PATENT DOCUMENTS

| | | |
|---|---|---|
| GB | 2437162 | 10/2007 |
| WO | 2010125325 A1 | 11/2010 |
| WO | 2013098759 A1 | 7/2013 |

OTHER PUBLICATIONS

PCT Search Report and Written Opinion issued in connection with corresponding PCT Application No. PCT/US2015/018371 on Sep. 24, 2015.

*Primary Examiner* — Vibol Tan
(74) *Attorney, Agent, or Firm* — GE Global Patent Operation; Peter T. DiMauro (57) ABSTRACT

Provided is an outdoor lighting assembly including at least one lighting arrays having one or more light sources configured for lighting a plurality of zones. At least one controller is operatively coupled to the at least one lighting array. The controller is configured to independently change optical outputs of the one or more light sources in each of the zones.

19 Claims, 11 Drawing Sheets

(56) References Cited

U.S. PATENT DOCUMENTS

| | | | |
|---|---|---|---|
| 8,576,406 B1* | 11/2013 | Jannson et al. | 356/496 |
| 2004/0213014 A1 | 10/2004 | Koike | |
| 2009/0267540 A1 | 10/2009 | Chemel | |
| 2010/0073927 A1* | 3/2010 | Lewin et al. | 362/240 |
| 2010/0277902 A1* | 11/2010 | Choi | F21S 8/086 362/231 |
| 2011/0235335 A1* | 9/2011 | Ishida | F21S 8/086 362/296.01 |
| 2012/0206050 A1* | 8/2012 | Spero | 315/152 |
| 2012/0319616 A1 | 12/2012 | Quilici | |
| 2013/0009553 A1 | 1/2013 | Lee | |
| 2013/0241418 A1 | 9/2013 | Kercso et al. | |
| 2015/0096210 A1* | 4/2015 | Monti | 40/564 |

* cited by examiner

| 0-10V Signal | Zone 1 | Zone 2 | Zone 3 | Scene |
|---|---|---|---|---|
| 0-1V | 10% | 10% | 10% | Full dim |
| 1-3V | 10% | 100% | 100% | Eastbound car |
| 3-6V | 50% | 50% | 50% | Standby (2AM-5AM) |
| 6-9V | 100% | 100% | 10% | Westbound car |
| 9-10V | 100% | 100% | 100% | Full on |

METHOD AND SYSTEM FOR AN ELECTRONICALLY ADAPTIVE PHOTOMETRY FOR ROADWAY LIGHTING

FIELD OF THE INVENTION

The present invention relates generally to light fixture design. More particularly, the present invention relates to dynamically changing light levels of a light emitting diode (LED) array in pre-defined zones.

BACKGROUND OF THE INVENTION

Outdoor lighting fixtures typically have limited functionality in that it's only possible to statically reduce the intensity of all of the light or distribute the light from the fixture equally. Functionality is also limited because the optical distribution for the lighting fixture can be set only once, and never again altered.

Advancements in wireless communication, telemetric data services, and vehicular systems offers greater possibilities for dynamically changing the intensity and distribution of the light for optimally meeting the needs of drivers.

For example, many outdoor lighting fixtures waste valuable resources when unnecessarily operating at full light distribution in all illuminated zones though use of only a portion of the light would suffice. Further, many outdoor lighting fixtures may perform sub-optimally by not providing enough light or, in contrast by providing too much light. Either circumstance may negatively affect road visibility conditions.

SUMMARY OF EMBODIMENTS OF THE INVENTION

Given the aforementioned deficiencies, a need exists for methods and systems for dynamically changing light levels within an LED array in a plurality of pre-defined zones.

In certain circumstances, an embodiment provides an outdoor lighting assembly including at least one lighting arrays having a plurality of light sources configured for lighting a plurality of zones. At least one controller is operatively coupled to the at least one lighting array. The controller is configured to independently change optical outputs of the one or more light sources in each of the plurality of zones.

In the embodiments, luminance at each outdoor light assembly can be selectively adjusted based on scenic factors, environmental factors, a variety of sources of telemetric factors. By way of example, these additional factors include wireless communication data, other outdoor lighting assembly data, global positioning system data, roadside assistance data, vehicular data, satellite data, base station data, weather data, occupancy sensor data, and photo sensor data etc. For example the photo sensors can measure, then dim, light directed from the surface towards the driver.

Intensity and distribution patterns can be dynamically changed via wireless communication. Alternatively, these features can be changed by the use of sensors installed within the light fixture or by communicating with vehicles fitted with telemetry modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
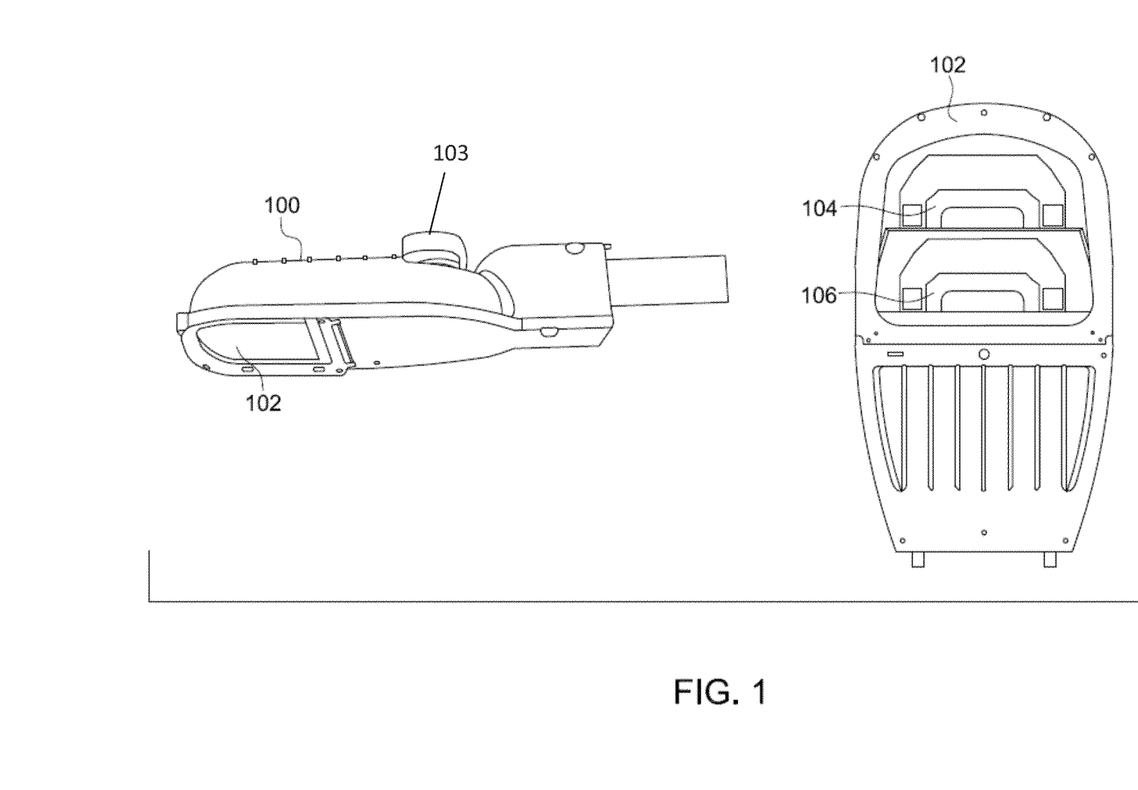
FIG. 1 is an illustration of a roadway optical platform in which embodiments of the present invention can be practiced.
Figure 2A:
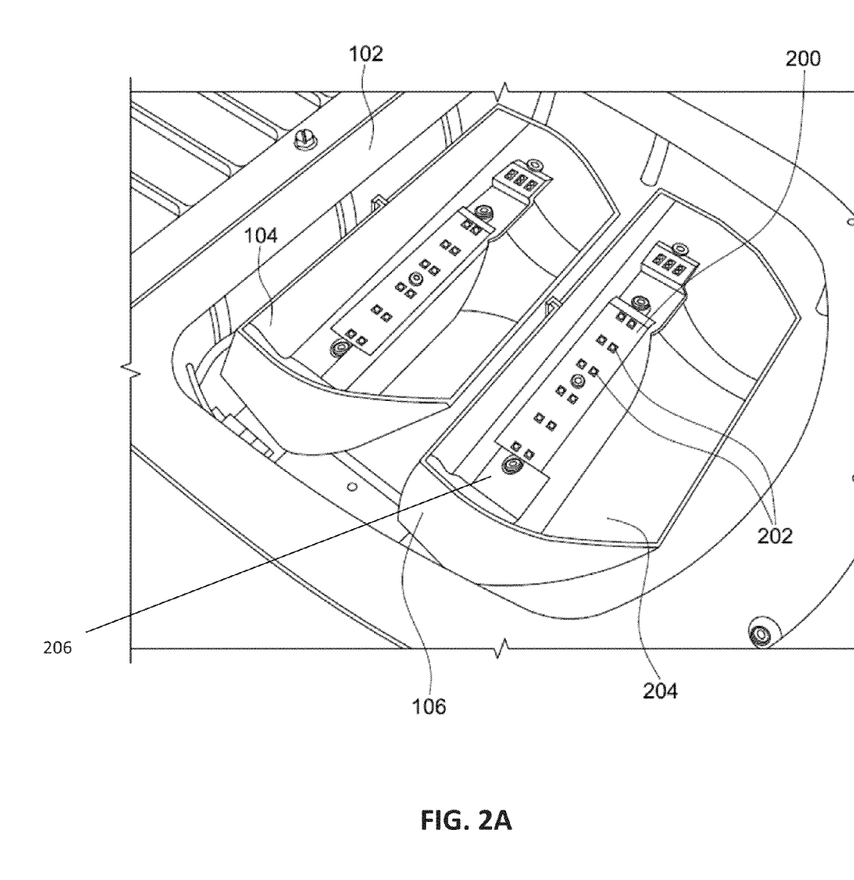
FIG. 2A is a more detailed illustration of LED array assemblies depicted in FIG. 1.

FIG. 1 is an illustration of a roadway optical platform 100 in which embodiments of the present invention can be practiced. The optical platform 100 is configured, for example, for use in a roadway lighting system. The optical platform 100 has a lighting segment 102, including two LED light engine modules 104 and 106. A communications module 103 includes, for example, a photo sensor, wireless communications circuitry, and the like. FIG. 2A provides a more detailed illustration of the LED array light engine modules 104 and 106.

In FIG. 2A, each of the LED light engine module 104 and 106 includes an LED lighting array 200 comprised of a plurality of LEDs, such as LEDs 202. The LED lighting array 200 also includes a conventional two-piece reflector assembly 204 for reflecting and distriting light produced by the LEDs 202 across an area, such as the surface of a roadway. The LEDs 202 are mounted within a printed circuit board (PCB) 206.

Figure 2B:
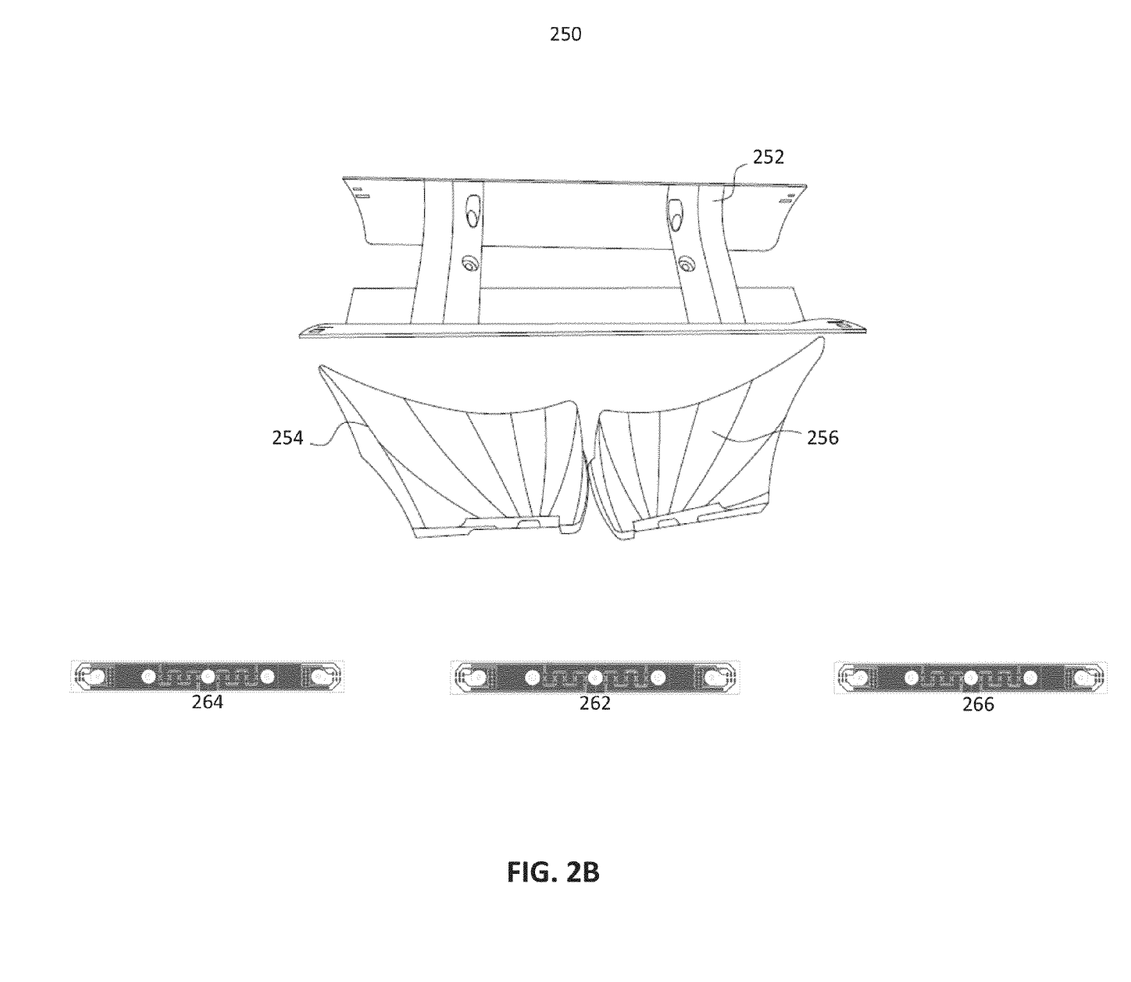
FIG. 2B is an illustration of a multi-reflector LED array assembly in accordance with the embodiments.

FIG. 2B is an alternative embodiment of the present invention. In FIG. 2B, the multi-part reflector 250 includes an elongated center portion 252, a left end-cap portion 254, and a right end-cap portion 256. The three reflector portions 252, 254, and 256 are associated with LED PCB assembly arrays to 262, 264, and 266, respectively.

By way of background, streetlights are configured to provide reflective lighting primarily into three different zones along a roadway. In the case of roadways, for example, where a vehicle travels along the roadway at night, a first zone includes an area in the direction of the traveling vehicle (e.g., shining away from a driver). A second zone, for example, is referred to by those of skill in the art as Nadir: the area directly below the street light. A third zone includes light shining towards the driver. These areas generally represent the three roadway reflective lighting zones.

Each of the reflector portions 252, 254, and 256 of the multi-part reflector 250 reflects light into one of the reflective lighting zones noted above. For example, the left portion 256 reflects light into a first of the lighting zones (zone 1). The elongated center portion 252 primarily directs light on Nadir (zone 2) and the right portion 256 reflects light into the third lighting zone (zone 3).

Other embodiments can employ two or more light sources that emit light into 2 or more zones, independently dimming the emitted light sources, completely devoid of principles of reflection or refraction.

Figure 3:
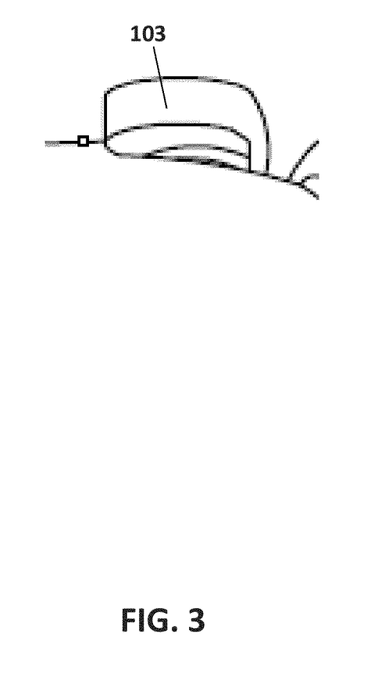
FIG. 3 is a more detailed illustration of the communications modules depicted in FIG. 1.

FIG. 3 is an illustration of the communications module 103 of FIG. 1 in greater detail. Communications circuitry, within the communications module 103, can be placed in electrical communication with controllers, as described in detail below.

Figure 4A:
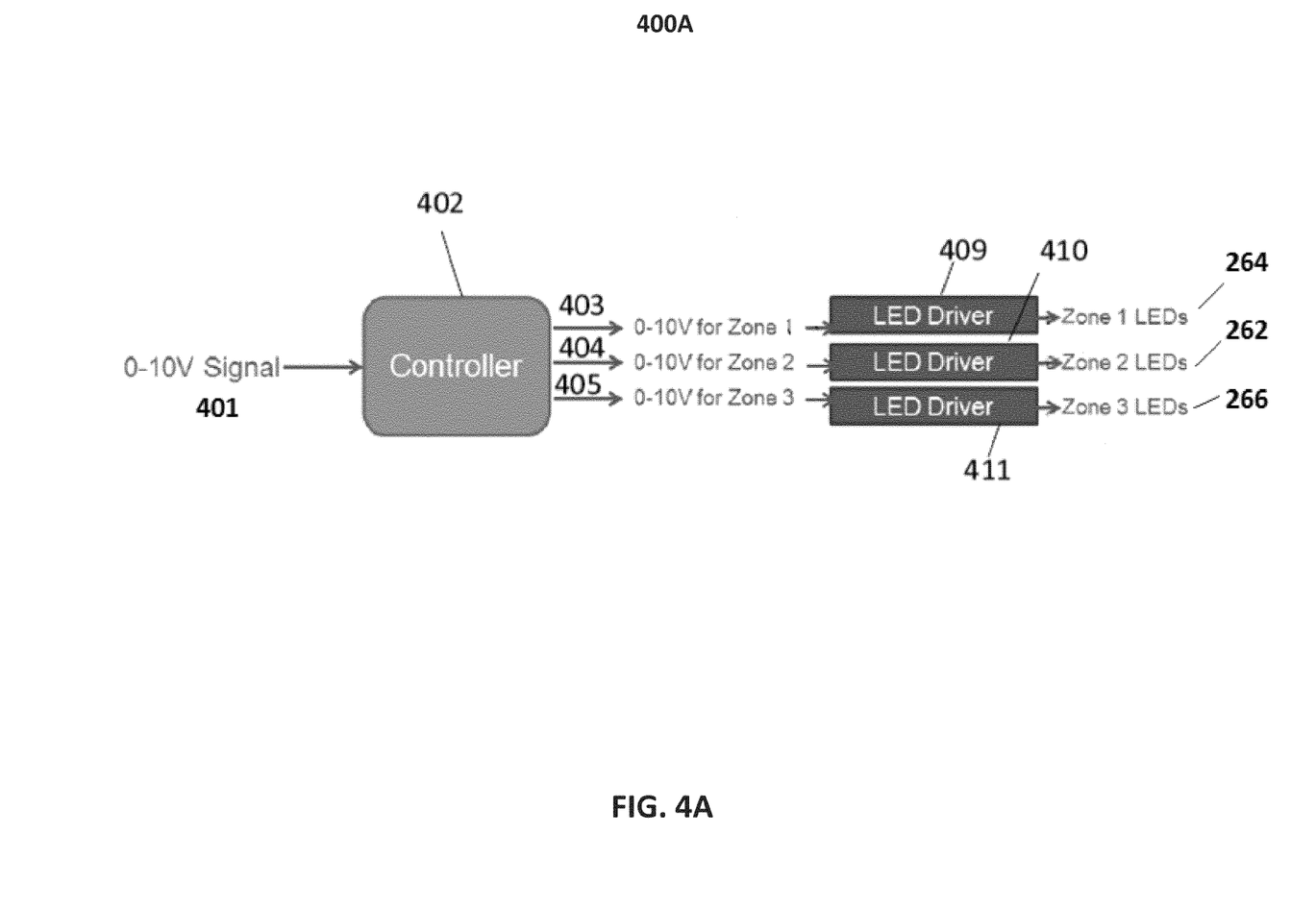
FIG. 4A is an illustration of an exemplary dynamic light control assembly constructed in accordance with a first embodiment of the present invention.

FIG. 4A is an illustration of an exemplary dynamic light control assembly 400A constructed in accordance with a first embodiment of the present invention. The light control assembly 400A is configured to dynamically control multiple LEDs, or LED arrays, such as the LED arrays 262, 264, and 266. In the system 400A, a user in a remotely located control center can wirelessly transmit a specifically formatted control signal 401 to initiate dynamic control of the LED arrays 262, 264, and 266.

In FIG. 4A, a programmable controller 402 is configured to receive the specifically formatted control signals 401 as an input. The programmable controller 402 processes control signals 401 and produces output signals 403, 404 and 405, each being configured to control a respective one of the LED drivers 409, 410, and 411. That is, each of the output signals 403, 404 and 405 includes different characteristics (e.g., voltage or modulation levels) addressed to each of the LEDs 264, 262, and 266.

For example, each of the signals 403, 404, and 405 can have a unique voltage level between the range of 0-10v, configured to drive one of the LED drivers 409, 410, and 411, respectively. Each of the drivers 409, 410, and 411 controls distribution of light to one of the lighting zones 1-3. In this manner, a user can dynamically and separately control lighting in each of the zones 1, 2, and 3.

Figure 4B:
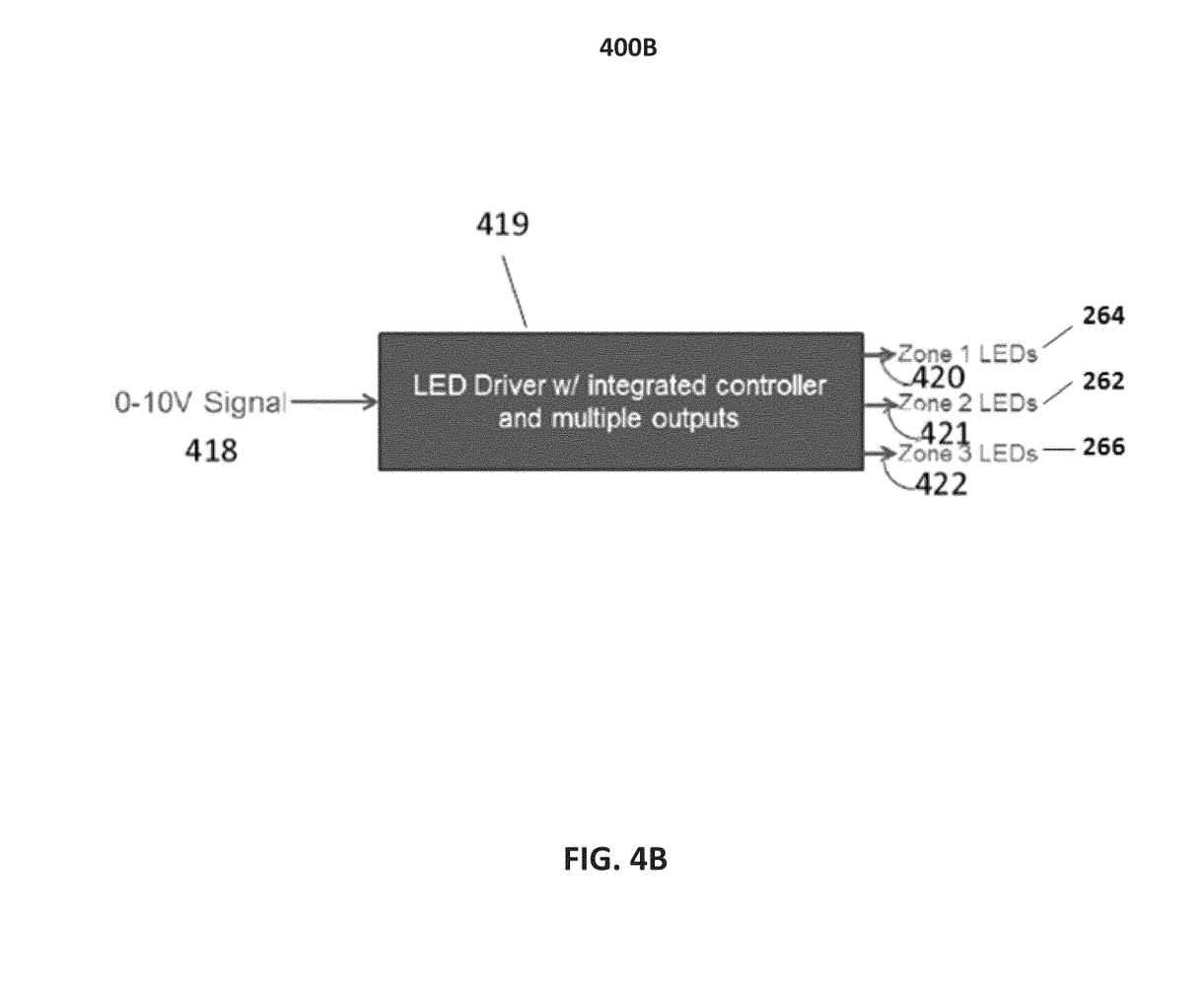
FIG. 4B is an illustration of an exemplary dynamic light control assembly constructed accordance with a second embodiment of the present invention.

FIG. 4B is an illustration of an exemplary dynamic light control assembly 400B constructed accordance with a second embodiment of the present invention. In FIG. 4B, controller functionality and multiple LED driver functionality are seamlessly integrated into a single controller/driver module 419. A control signal 418 is received as an input to the controller/driver module 419. The controller/driver module 419 processes control signal 418 and produces output signals 420, 421 and 422, each being configured to control a respective one of the LED arrays 264, 262, and 266. The LED arrays 264, 262, and 266 provide light distribution to the zones 1-3, respectively.

In the illustrious embodiments of FIGS. 4A and 4B, control signals 401 and 418 may be determined based on wireless communication or telemetry data, or other remotely acquired data. The control signals 401 and 418 may also be determined based upon imbedded data stored in look up tables, or a combination thereof. The data used for the control signals 401 and 418 and be acquired manually by a user, or in be automatically acquired from servers, computers, or any other non-human interfaces.

Figure 5:
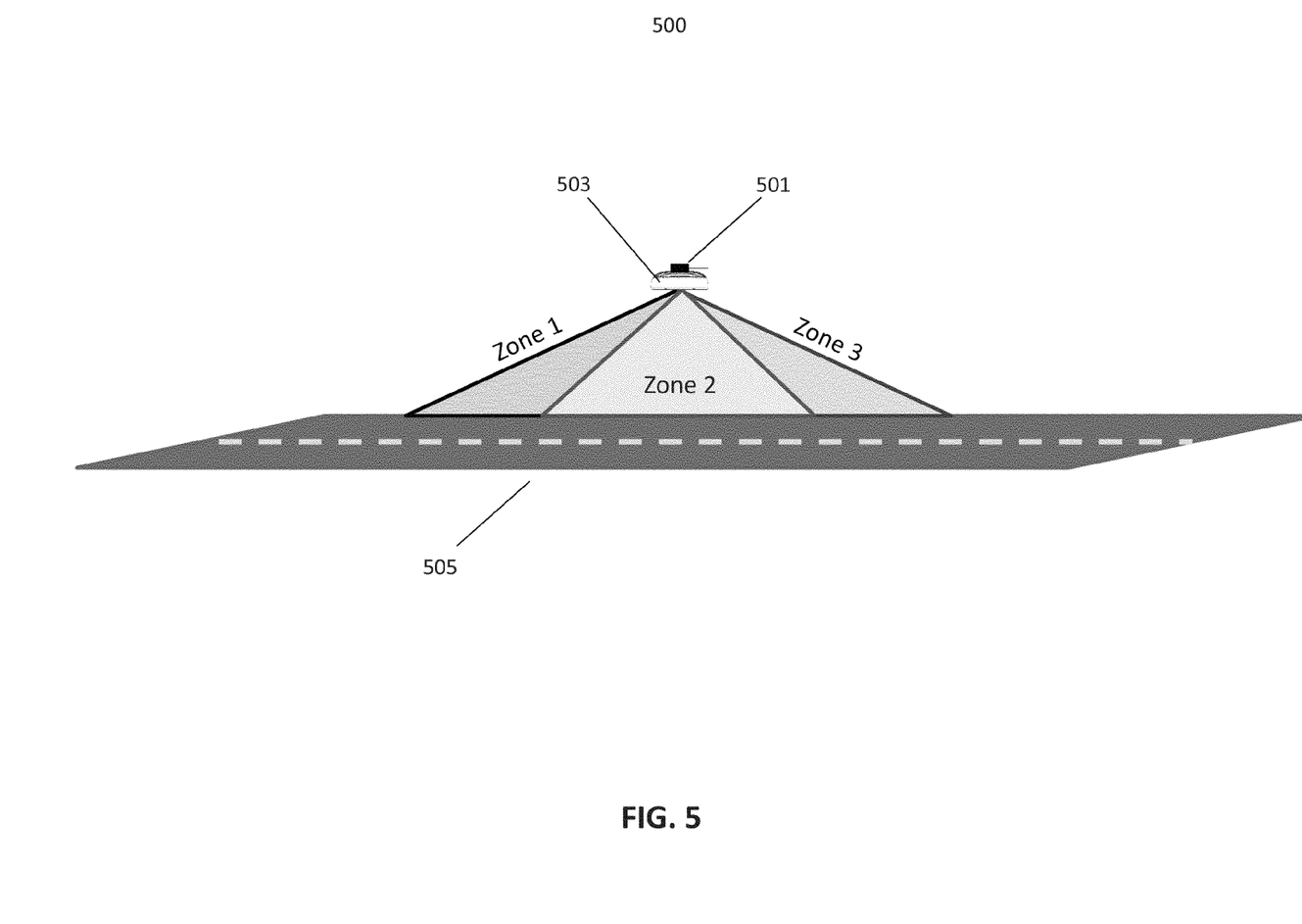
FIG. 5 is an illustration of a lighting assembly configured for dynamically controlling distribution and intensity levels in accordance with the embodiments.

FIG. 5 is an illustration of a lighting assembly 500 configured for dynamically controlling distribution and intensity levels in accordance with the embodiments. The lighting assembly 500 includes an addressable communications module 501, similar to the module 103 of FIG. 1. The communications module 501 is positioned atop a light fixture 503. The light fixture 503 includes one or more LED arrays (not shown), similar to the LED arrays 262, 264, and 266, discussed above.

In an exemplary lighting scenario, a controller within the communications module 501 wirelessly receives a control signal from a user, in a manner described above with reference to FIGS. 4A and 4B. The control signal enables the user to separately and dynamically control the distribution and intensity of light reflected towards lighting zones 1-3. The lighting zones 1-3 are configured to illuminate the surface of a roadway 505 at various angles. Although FIG. 5 includes 3 zones, embodiments of the present invention apply equally to a scenario including, for example, only 2 zones. For example, Nadir is not required.

Figure 6:
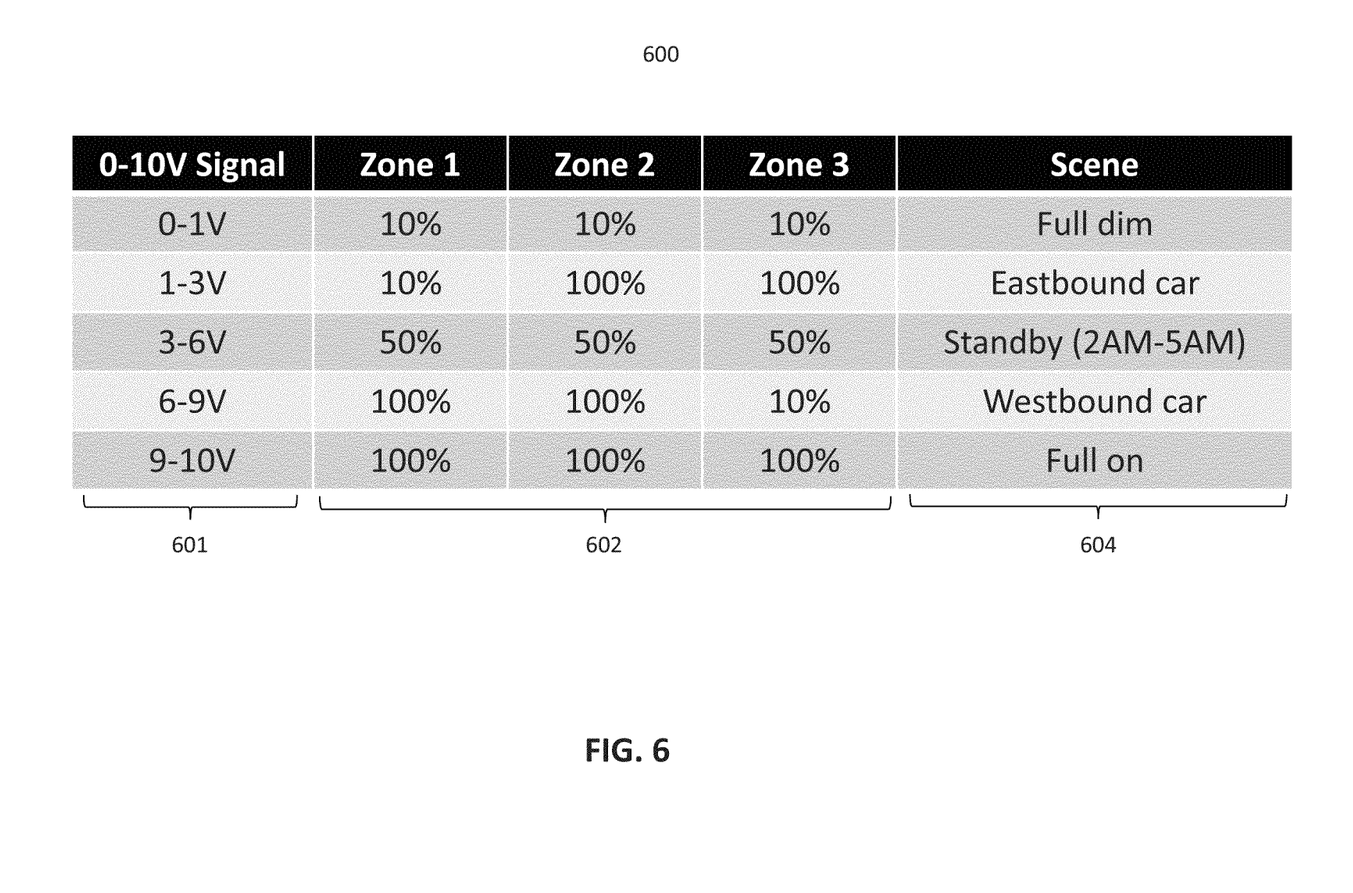
FIG. 6 is tabular illustration of exemplary numerical settings associated with dynamically controlling the different lighting zones included depicted in FIG. 5.

FIG. 6 is a tabular illustration of exemplary numerical settings 600 associated with controlling the light reflected towards the lighting zones 1-3. For purposes of illustration, the numerical settings 600 will be applied to the dynamic light control assembly 400B of FIG. 4A.

In the exemplary scenario of FIG. 6, the user can may program the control signal 418 in accordance with various voltage values 601 for input to the controller/driver module 419. Each of the control signal voltage values 601 adjusts the intensity of light to produce light intensity levels 602 in a corresponding one of the lighting zones 1-3. As a result, each control signal voltage value 601 produces a corresponding roadway scene (effect) 604.

In FIG. 6, for example, if the control signal 418 is programmed to have a value from 0-1V, the intensity of light distributed to each of the lighting zones 1-3 will be adjusted to a value of 10% of its maximum intensity. These settings produce a lighting scene that fully dims each of the respective lighting zones 1-3.

Similarly, if the control signal 418 is programmed to have a value from 6-9V, the intensity of light distributed to each of the lighting zones 1-3 be adjusted to an intensity value that is roughly 100%, 100%, and 10% of its maximum intensity, respectively. Correspondingly, these settings produce a lighting scene oriented towards a westbound car traveling through lighting zones 1-3.

As noted above, the numerical settings 600 of FIG. 6 are provided merely for purposes of illustration. One of ordinary skill will appreciate that the control signal 418 can be programmed to any suitable value 601, whether voltage values, modulation values, etc., to achieve various light intensity levels 602 in accordance with requirements of a particular lighting scene.

Figure 7:
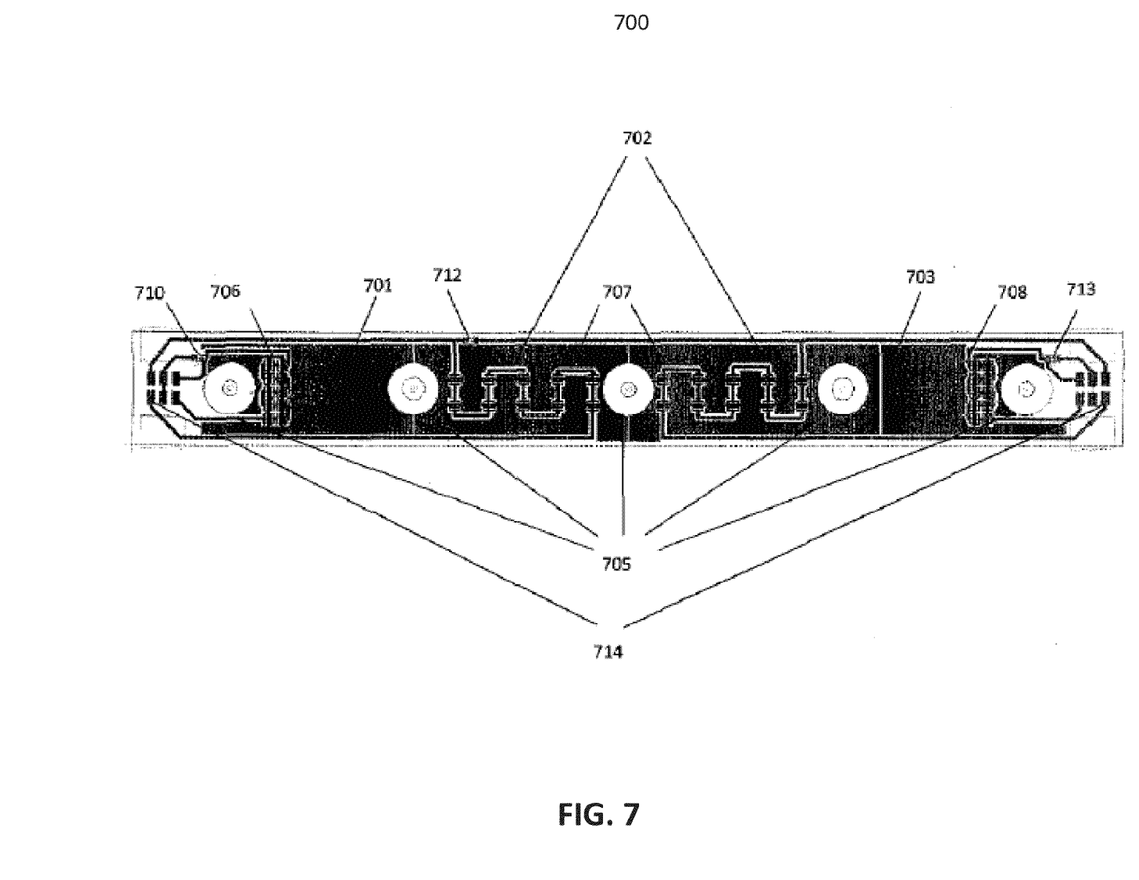
FIG. 7 is an illustration of a printed circuit board (PCB) for dynamic light control of LED array assemblies in accordance with the embodiments.

FIG. 7 is an illustration of a PCB 700 that can include the exemplary LEDs 202 of the LED array 200 of FIG. 2A. The PCB 700 is similar to the LED PCB assembly arrays 262, 264, and 266.

The PCB 700 includes jumpers 710, 712, and 713. PCB segments 701, 702, and 703 correspond to zone 1, zone 2, and zone 3, respectively. Addressable LED arrays 706, 707, and 708 are configurable to illuminate lighting zones 1-3, respectively. Electrical leads 714 are configurable to independently activate each LED in the LED arrays 706, 707, and 708 using bypass circuitry such as jumpers 710, 712, and 713. Connectors 705 are operative to fasten the PCB 700 to an optical platform, such as the platform 100 of FIG. 1.

Figure 8:
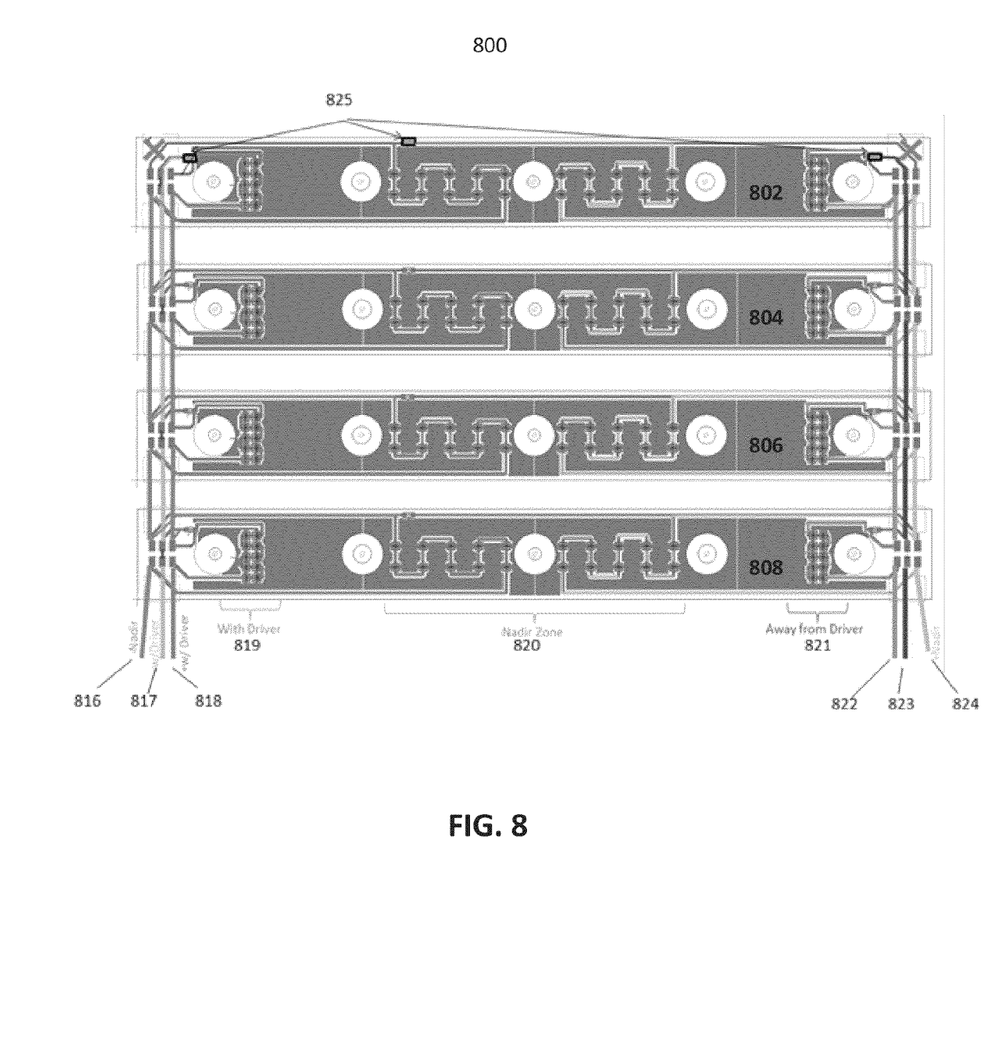
FIG. 8 is an illustration of a plurality of printed circuit boards for dynamic light control of LED array assemblies in accordance with the embodiments.

FIG. 8 is an illustration of an exemplary electrical arrangement 800 including PCBs 802, 804, 806, and 808, each similar to the PCB 700 of FIG. 7. Jumpers 825 facilitate the configuring of each of the PCBs 802, 804, 806, and 808. Also shown are conductive paths 816, 817, 818, 822, 823, and 824. PCB segments 819, 820, and 821 correspond to lighting zones 1, 2, and 3, respectively. More specifically, the conductive path 816, 817, and 818 enable control of optical outputs associated with nadir 820 (i.e. zone 2), a driver (zone 1), and away from the driver (zone 3).

Figure 9:
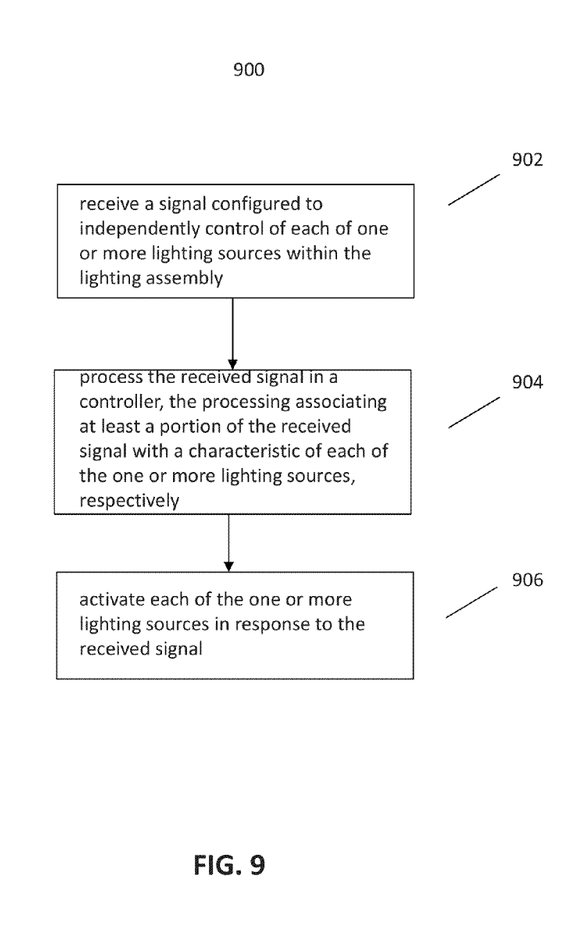
FIG. 9 is a flow chart of an exemplary method of practicing an embodiment of the present invention.

FIG. 9 is a flow chart of an exemplary method 900 of practicing an embodiment of the present invention. In the method 900, a signal is received and configured to independently control of each of one or more lighting sources within a lighting assembly in step 902. In step 904, the received signal is processed in a controller, the processing associating at least a portion of the received signal with a characteristic of each of the one or more lighting sources, respectively. Each of the one or more lighting sources is activated in response to the received signal in step 906.

CONCLUSION

The present invention has been described above with the aid of functional building layers illustrating the implementation of specified functions and relationships thereof. The boundaries of these functional layers have been arbitrarily defined herein for the convenience of the description. Alternate boundaries can be defined so long as the specified functions and relationships thereof are appropriately performed.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. An outdoor lighting assembly, comprising:
a multi-part reflector configured to reflect light in a plurality of lighting zones from the plurality of light sources;
at least one lighting array including a plurality of light sources configured for lighting the plurality of lighting zones; and
at least one controller (i) operatively coupled to the plurality of light sources and (ii) configured to receive a single control signal including data associated with each of the plurality of light sources of the at least one lighting array, and to independently control and adjust each of the plurality of light sources based the single control signal; and
wherein responsive to the received single control signal, the controller produces output signals for all of the plurality of light sources, wherein each output signal includes characteristics corresponding to a respective one of the plurality of light sources, and
wherein optical outputs of each of the plurality of light sources are controlled in accordance with the respective characteristics thereof based on the output signal received at each of the plurality of light sources.

2. The outdoor lighting assembly according to claim 1, wherein the at least one controller comprises at least one printed circuit board operative to addressably control the lighting of the plurality of lighting zones.

3. The outdoor lighting assembly according to claim 1, wherein at least the plurality of light sources are arranged to have a nadir direction for illuminating at least one area within the plurality of lighting zones to define nadir zones.

4. The outdoor lighting assembly of claim 3, wherein the at least one controller is configured to process telemetry data inputs to control optical outputs in at least one of the nadir zones and horizon zones.

5. The outdoor lighting assembly of claim 4, wherein the telemetry data inputs are stored in at least one of a group of a data table, a base station, a mobile robotic unit, and a satellite.

6. The outdoor lighting assembly of claim 5, wherein the at least one printed circuit board having at least one jumper, the at least one jumper having leads connected to the at least one or more light sources;
the at least one jumper in electronically operative arrangement with at least one connector;
the at least one printed circuit board having programmable units for controlling optical outputs in at least one of the nadir zones and the horizon zones to effectuate changing light source characteristics;
wherein the programmable units have at least one first input for controlling optical outputs within predetermined angle ranges within the nadir zones;
wherein the programmable units have at least one second input for controlling optical outputs within the horizon zone to electronically change optical output within predetermined angle ranges within the horizon zone; and
wherein the at least one first input and the at least one of a plurality of second inputs operate to automatically or manually control optical outputs of the plurality of light sources based on dynamic or predetermined scenic conditions.

7. The outdoor lighting assembly according to claim 6, wherein scenic conditions are converted into computer readable data usable to trigger optical output change operations.

8. The outdoor lighting assembly according to claim 7 wherein the outdoor lighting assembly is configured to have a radio-frequency transmitter for transmitting telemetry information to other outdoor lighting assemblies having telemetry receivers using received telemetry data to change optical outputs in nadir zones and horizon zones of the other outdoor lighting assemblies by triggering other luminance change operations in the other outdoor lighting assemblies.

9. The outdoor lighting assembly according to claim 8 wherein the at least one controller operates to independently address the at least one lighting array.

10. A method of controlling distribution of light to an outdoor lighting assembly including at least one lighting array including a plurality of light sources configured for lighting a plurality of lighting zones, the method comprising:
reflecting, via a multi-part reflector light in a plurality of lighting zones from the plurality of light sources;
receiving a single control signal, via a controller coupled to the plurality of light sources, the single control signal including data associated with each of the plurality of light sources of the at least one lighting array, to independently control and adjust each of the plurality of light sources;

processing the received single control signal to produce output signals for all of the plurality of light sources, wherein each output signal includes having characteristics corresponding to a respective one of the plurality of light sources; and controlling optical outputs of each of the plurality of light sources in accordance with the respective characteristics thereof based on the output signal received at each of the plurality of light sources.

11. The method of claim 10, wherein the controlling includes distributing light to each of the plurality of lighting zones, respectively.

12. The method of claim 11, wherein the outdoor lighting assembly includes one or more modules configured for driving the plurality of light sources.

13. The method of claim 12, wherein the outdoor lighting assembly includes one or more modules configured for driving the the plurality of light sources, respectively.

14. The method of claim 13, wherein the control signal is user programmable.

15. The method of claim 14, wherein the processing includes determining at least one from the group including a voltage level and a modulation level of the control signal.

16. The method of claim 15, wherein the characteristic includes at least one from the group including intensity, and distribution angle.

17. The method of claim 16, wherein the the plurality of light sources include light emitting diodes (LEDs).

18. The method of claim 17, wherein the one or more modules include LED drivers; and wherein the LED drivers in the controller are integrated into a single module.

19. The method of claim 10, wherein the controlling includes changing the characteristics of each of the plurality of light sources.

* * * * *